May 12, 1970 T. H. PAULSON 3,511,037
CONED ROTOR FOR MECHANICAL BEAN PICKER
Filed Jan. 5, 1968

INVENTOR.
THOMAS HOWARD PAULSON
BY
Merchant & Gould
ATTORNEYS

United States Patent Office 3,511,037
Patented May 12, 1970

3,511,037
CONED ROTOR FOR MECHANICAL
BEAN PICKER
Thomas Howard Paulson, Clayton, Wis., assignor to Pixall Corporation, Clear Lake, Wis., a corporation of Wisconsin
Filed Jan. 5, 1968, Ser. No. 696,078
Int. Cl. A01d 45/22
U.S. Cl. 56—130
4 Claims

ABSTRACT OF THE DISCLOSURE

A generally conical gathering rotor for a mobile bean picking machine and disposed on a normally horizontal axis extending longitudinally of the direction of machine travel, the rotor tapering forwardly and having a core and a plurality of circumferentially and longitudinally spaced forwarding sloping tines extending generally radially outwardly from the core. The tines each describe a cone of movement responsive to rotation of the rotor, and are adapted to move laterally and upwardly through the bean plants to pick the pods from the plant.

SUMMARY OF THE INVENTION

This invention is in the nature of an improvement on bean picking rotors of the type disclosed in prior U.S. Letters Patents to Paulson et al., 3,190,062 and 3,282,036. An important object of this invention is the provision of a picking rotor which is highly efficient in picking pods from bean plants without also reaping or taking unwanted portions of bean plants or other foreign material; and which provides for a more gentle picking action and treatment of the bean plants than heretofore obtained. To these ends, I provide a gathering rotor having a core comprising a plurality of circumferentially spaced forwardly converging mounting bar elements and a plurality of spaced resilient picker tines on each of said bar elements and disposed generally normal to the longitudinal dimensions of their respective bar elements, the tines extending generally radially outwardly from the core, whereby to be disposed at oblique angles to the axis of rotation of the core. The tines are of substantially equal length, and are spaced apart a greater distance longitudinally of the rotor adjacent the front end of the rotor than adjacent the rear end thereof.

DETAILED DESCRIPTION

Figure 1:
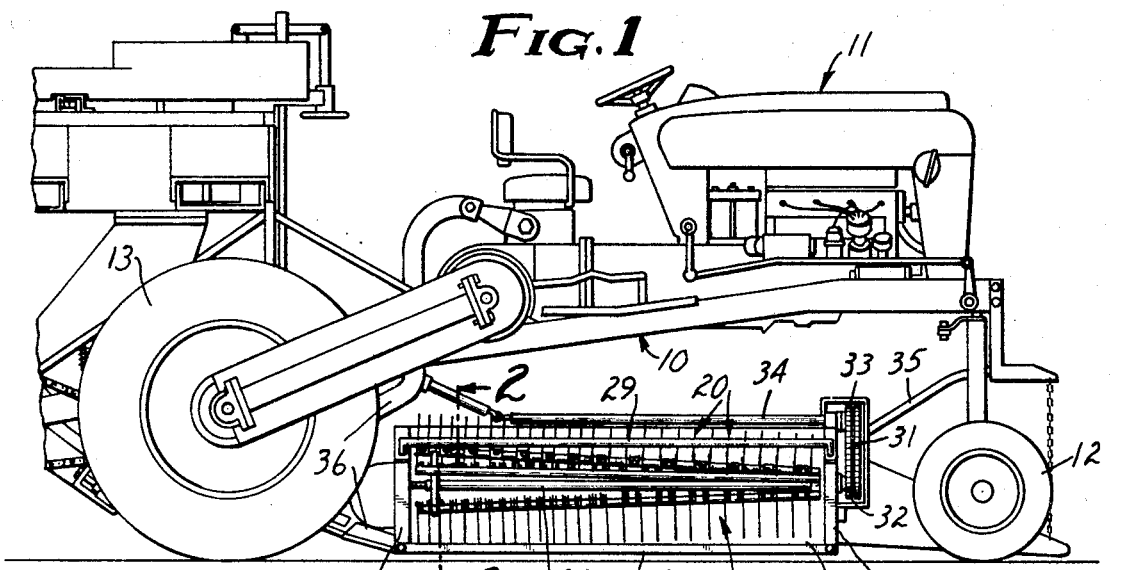
FIG. 1 is a view in side elevation of a mechanical picker utilizing the present invention, some parts thereof being broken away.

A bean picking machine of the type illustrated in the aforementioned Paulson et al. Pat. 3,282,036 is shown fragmentarily in FIG. 1 as including an elongated frame 10 having power mechanism such as an engine 11 at its forward end. The frame 10 is supported by a pair of steerable wheels 12, one of which is shown, at the forward end thereof, and by a pair of laterally spaced drive wheels 13, one of which is shown. An elongated horizontally extending guide plate 14 is mounted on the frame 10 and slopes laterally outwardly and downwardly therefrom. A second guide plate, not shown, is mounted in a similar relationship on the opposite side of the frame 10.

A gathering rotor, indicated in its entirety by the reference numeral 15, is mounted for rotation on the frame 10, and is laterally spaced from the frame 10 on a normally horizontal axis extending generally longitudinally of the direction of travel of the picking machine, the axis of the rotor 15 being disposed laterally outwardly of the outer longitudinal edge of the guide plate 14 and above the level of the guide plate 14. A second gathering rotor, not shown, is mounted in substantially the same manner as the rotor 15, on the opposite side of the frame 10, the axes of the two rotors being generally parallel. The rotor 15 includes a core comprising a plurality of circumferentially spaced mounting bar elements 17 that are welded or otherwise rigidly secured at their opposite end portions to axially spaced front and rear plate-like headers 18 and 19 respectively. It will be noted that the rear header 19 is of substantially greater diameter than that of the front header 18, whereby the bar elements 17 converge from the rear to the front end of the rotor 15. For the purpose of the present example, the bar elements 17 are five in number, and are preferably made from metal tubing. The rotor 15 further includes a plurality of circumferentially and longitudinally spaced generally radially extending resilient picker tines 20 of the type disclosed in the above mentioned Paulson et al. Pat. 3,190,062, and are detachably secured to the mounting bar elements 17. As shown, the tines 20 comprise coils 21 between their radially outer ends 22 and their inner ends 23. The inner ends 23 are formed to extend partially around the adjacent bar elements 17 and are releasably anchored thereto by clamping plates 24 and nut-equipped clamping bolts 25, see particularly FIG. 4. It will be noted with reference to FIGS. 1 and 3, that the tines 20 are axially spaced apart a greater distance on the forward half of the rotor 15 than at the rearward half thereof. It will be further noted that the tines 20 are of equal length, and are disposed at right angles or normal to the longitudinal dimension of their respective mounting bar elements 17, whereby to slope forwardly at an oblique angle to the horizontal axis of rotation of the rotor 15.

The rotor 15 further includes an axial shaft 26 that extends through and is rigidly secured to the headers 18 and 19, the opposite end portions of the shaft 26 being journalled in front and rear end frame members 27 and 28 respectively that are connected by longitudinally extending brace rods 29 and 30. The rotor 15 is operatively connected to the engine 11 by suitable drive means including an endless link chain 31 entrained over sprocket wheels 32 and 33, the sprocket wheel 32 being mounted on the front end of the rotor shaft 26, the sprocket wheel 33 being mounted on one end of a drive shaft means 34 that may be assumed to be connected to a power take-off mechanism of the engine 11, not shown. The end frame members 27 and 28 are supported by front and rear support members 35 and 36 respectively for raising and lowering movements in a conventional manner.

Figure 2:
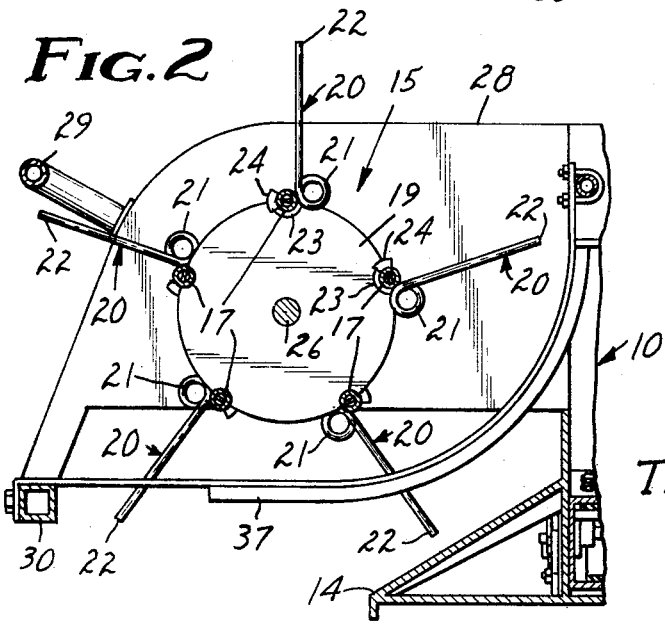
FIG. 2 is an enlarged fragmentary section taken substantially on the line 2—2 of FIG. 1.

As the machine is driven between spaced rows of bean plants, not shown, the rotor 15 and the rotor, not shown, on the opposite side of the frame 10, will be positioned so that the tines 20 at the bottom portion of each rotor will pass laterally through the rows of plants. Rotary movement, in the direction of the arrow in FIG. 2, is imparted to the rotors 15 simultaneously with forward movement being imparted to the frame 10. The resilient picker tines 20 of the rotors 15 pass upwardly and inwardly through the plants of the adjacent rows, and detach the bean pods from the plants, the detached bean pods being lifted or drawn upwardly into the delivery flight of a conveyor, not shown.

The tines 20 being of uniform or equal length, the forwardly converging relationship of the mounting bar elements 17 causes the outer ends 22 of the tines 20 to define a rotor structure that is shaped generally like a forwardly tapering frustum of a cone. With this arrangement, as the picking machine progresses along the rows of bean plants, the tines 20 at the front end portion of the rotor 15 engage the top portions of the bean plants, succeeding tines 20 passing through progressively lower parts of the plants. Further, the peripheral speed of the outer tine ends 22 being less at the front end portion of the rotor 15 than at the rear end thereof, the combing action of the tines 20 on the bean plants is slower and more gentle at the front end of the rotor 15 than at the rear end thereof. Thus, the bean plants are initially combed to provide for easier passage of succeeding tines 20 therethrough, substantially lessening the breaking of stems and leaves from the bean plants without lessening the effective pod picking action of the tines 20.

I have found, that by disposing the tines 20 in a forwardly sloping direction, as shown, that each tine 20, describing a shallow generally conical path during rotation of the rotor 15, causes the rotor to more effectively strip the bean plants of the bean pods than heretofore possible.

Figure 3:
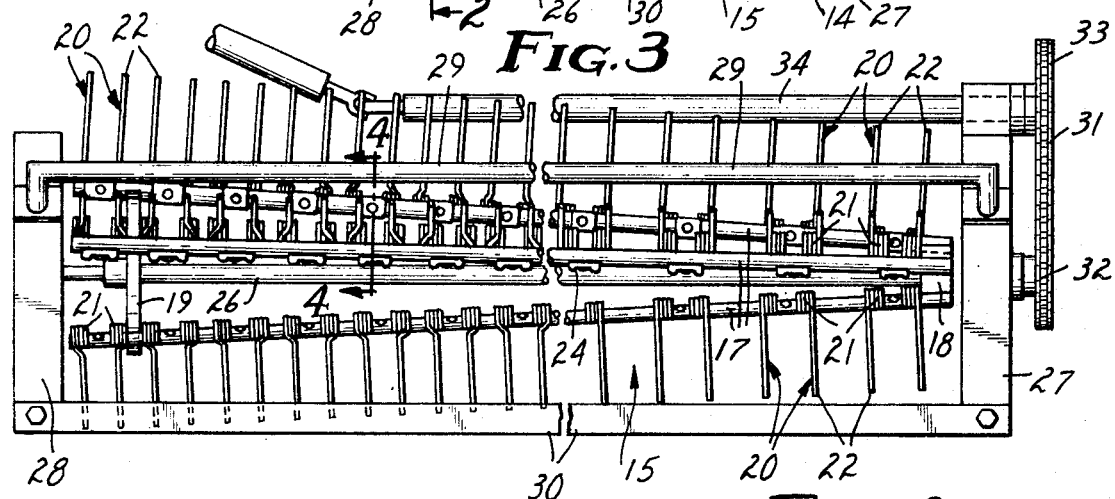
FIG. 3 is an enlarged view in side elevation of the rotor of FIGS. 1 and 2, parts thereof being removed.
Figure 4:
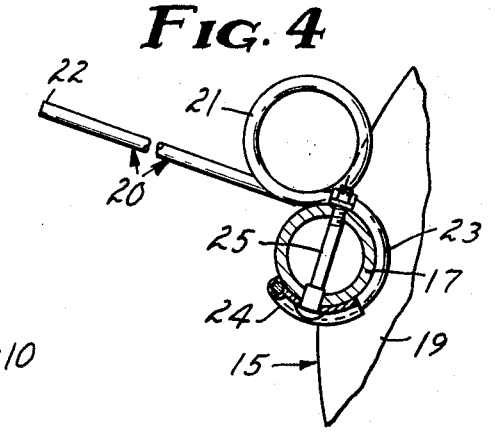
FIG. 4 is an enlarged fragmentary section taken on the line 4—4 of FIG. 3.

Although not shown in FIG. 1 or 3, a plurality of stripper fingers 37 are secured at their upper ends to a portion of the frame 10, and at their lower outer ends to the brace rod 30, see FIG. 2. These stripper fingers are disposed between adjacent picker tines 20, as disclosed in the above-identified Paulson et al. patents, and operate to strip from the tines 20 any of the beans or parts of the bean plants which might stick to the tines 20.

What is claimed is:

1. In a mechanical picker for beans and the like planted in rows, a gathering rotor mounted for rotation on an axis extending generally longitudinally of the direction of travel of the picker, said rotor including a core and a plurality of longitudinally and circumferentially spaced resilient picker tines extending generally radially outwardly from the core, said tines sloping forwardly at an oblique angle to the axis of rotation of said core, each of said tines describing a cone of movement during rotation of the rotor, and having outer ends disposed to describe circles responsive to rotation of said rotor, said tines being disposed to move progressively further downwardly into bean plants from the front end of said rotor to the rear end thereof, said outer ends of the tines being adapted to move laterally and upwardly through the plants to pick pods from the plants.

2. The device defined in claim 1, in which said core includes a plurality of circumferentially spaced mounting bar elements disposed in forwardly converging relationship, said tines having inner end portions secured to said bar elements and extending outwardly therefrom in directions normal to the longitudinal dimensions of their respective bar elements.

3. The device defined in claim 2, in which said tines are of substantially equal length.

4. The device defined in claim 2, in which said core includes axial shaft means and a pair of axially spaced relatively small and relatively larger diameter front and rear headers respectively mounted on said shaft means, said bar elements having opposite end portions secured to said headers.

References Cited

UNITED STATES PATENTS

| | | | |
|---|---|---|---|
| 3,190,062 | 6/1965 | Paulson et al. | 56—130 |
| 3,228,176 | 1/1966 | Stout et al. | 56—19 |
| 3,306,013 | 2/1967 | Whitman | 56—19 |

LOUIS G. MANCENE, Primary Examiner

J. N. ESKOVITZ, Assistant Examiner